(No Model.)

T. S. WILKIN.
SAW MILL DOG.

No. 394,045. Patented Dec. 4, 1888.

Witnesses
Geo. W. Young
William Klug

Inventor
Theodore S. Wilkin
By Stent & Underwood
Attorneys.

UNITED STATES PATENT OFFICE.

THEODORE S. WILKIN, OF MILWAUKEE, WISCONSIN.

SAW-MILL DOG.

SPECIFICATION forming part of Letters Patent No. 394,045, dated December 4, 1888.

Application filed August 13, 1888. Serial No. 282,614. (No model.)

*To all whom it may concern:*

Be it known that I, THEODORE S. WILKIN, of Milwaukee, in the county of Milwaukee, and in the State of Wisconsin, have invented certain new and useful Improvements in Saw-Mill Dogs; and I do hereby declare that the following is a full, clear, and exact description thereof.

My invention relates to saw-mill dogs; and it consists, principally, in certain improvements in wing-knees therefor, which will be fully described hereinafter.

Figure 1:
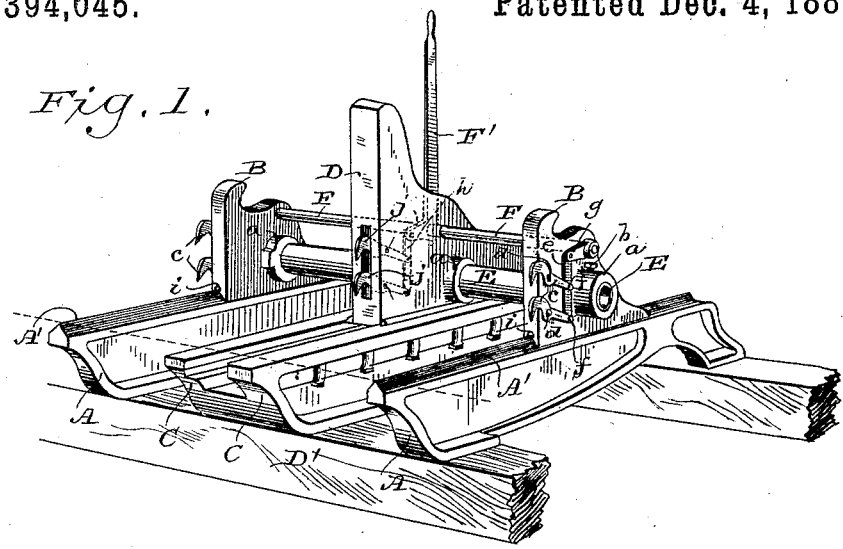
Figure 2:
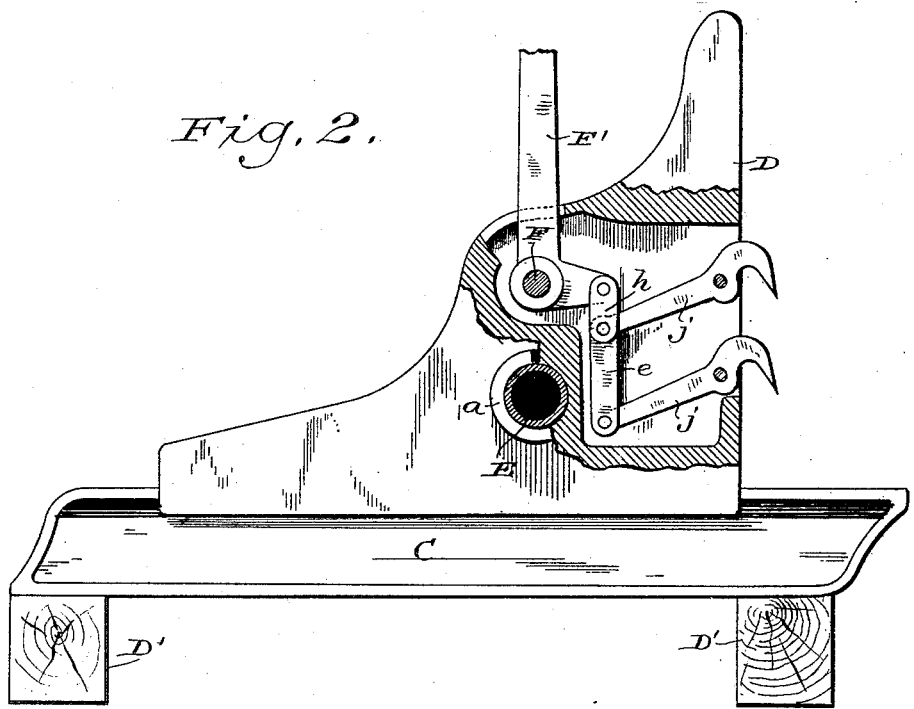

In the drawings, Figure 1 is a perspective view of my device, and Fig. 2 is a broken section of the main dog.

A are the ways upon which the wing-knees B are adjusted, and C are the ways upon which the main knee D slides.

D' is the carriage.

The main knee D is formed with a hub, $a$, through which a gas-pipe E, passes, forming a connecting-rod, which passes through like hubs in the wing-knees B, and thus the three knees are connected. Though the connecting-rod should fit snugly in the hubs, it should be sufficiently loose to permit the adjustment of the knees with relation to each other, after which they may be locked in adjustment by suitable keys or set-bolts, as at $b$, Fig. 1. Each wing-knee is provided with one, two, or more dogs, $c$, of any approved style. The front ends of these dogs project in front of the vertical line of the face of the knees, while the rear ends of the dogs forming each pair are coupled together by a bar, $e$, to which they are pivoted at $ff$, and these bars are suspended from a rock-shaft, F, by arms $g$, which project therefrom. This shaft F extends through the upper portion of the knees B and D and between the walls of the main knee a lever, F', is keyed onto it, one arm of which lever is connected by a toggle-link, $h$, with the connected dogs $j$ of the main knee, while its other arm serves as a handle which operates all the dogs. Any number of knees may be connected by the connecting-rod E.

The upper face of each of the ways A A are beveled to a knife-edge, as at A', and these edges extend up to a higher plane than do the ways C C, so that when a log is placed on the ways its weight will cause the knife-edges to cut the underlying bark and prevent it from accumulating on the ways. The bearing-surfaces of the knees B are grooved to correspond with the bevel of the ways, and the upper end of the groove in each way is enlarged, as at $i$, to prevent any contact between the under side of the knee and its subjacent knife-edge.

Having thus fully described my invention, what I claim as new, and desire to secure by Letters Patent, is—

1. The combination, in a saw-mill carriage, of a main knee, a connecting-rod carried thereby, and wing-knees adjustably connected with said main knee by said connecting-rod, a dog or dogs carried by each of the knees, a shaft connecting the dogs of the three knees with each other, and a suitably-located operating-lever.

2. The combination, with the main knee, of wing-knees connected therewith, and ways for the wing-knees, said ways formed with knife-edged surfaces for supporting the log, substantially as described.

In testimony that I claim the foregoing I have hereunto set my hand, at Milwaukee, in the county of Milwaukee and State of Wisconsin, in the presence of two witnesses.

THEODORE S. WILKIN.

Witnesses:
S. S. STOUT,
WILLIAM KLUG.